United States Patent
Molnar et al.

(10) Patent No.: US 7,672,966 B2
(45) Date of Patent: Mar. 2, 2010

(54) ADDING EXTRINSIC DATA COLUMNS TO AN EXISTING DATABASE SCHEMA USING A TEMPORARY COLUMN POOL

(75) Inventors: Ladislau Molnar, Sammamish, WA (US); Patrick Conlan, Redmond, WA (US); Alexander Sourov, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 495 days.

(21) Appl. No.: 10/881,305

(22) Filed: Jun. 30, 2004

(65) Prior Publication Data

US 2006/0004686 A1 Jan. 5, 2006

(51) Int. Cl.
*G06F 17/00* (2006.01)
(52) U.S. Cl. .................. 707/102; 707/100; 707/101
(58) Field of Classification Search ............. 707/1
See application file for complete search history.

(56) References Cited

U.S. PATENT DOCUMENTS

| | | | | |
|---|---|---|---|---|
| 5,201,046 A | * | 4/1993 | Goldberg et al. ......... | 707/100 |
| 5,548,749 A | * | 8/1996 | Kroenke et al. ......... | 707/102 |
| 5,717,924 A | * | 2/1998 | Kawai ................... | 707/102 |
| 5,933,830 A | * | 8/1999 | Williams ............... | 707/100 |
| 5,963,642 A | * | 10/1999 | Goldstein ............... | 713/193 |
| 6,574,631 B1 | * | 6/2003 | Subramanian et al. ... | 707/101 |
| 6,754,666 B1 | * | 6/2004 | Brookler et al. ......... | 707/102 |
| 2003/0055834 A1 | * | 3/2003 | Hansen et al. .......... | 707/101 |

OTHER PUBLICATIONS

"The Authoritative Dictionary of IEEE Standards Terms Seventh Edition," IEEE Press, 2000.*

Cranor, Chuck et al., "Gigascope:: High Performance Network Monitoring with an SQL Interface," SIMBOD 2002, Jun. 3-6, 2002, Madison, Wisconsin, Copyright 2002 ACM (1 page).

Baralis, Elena et al., "Modularization Techniques for Active Rules Design," ACM Transactions on Database Systems, vol. 21, No. 1, Mar. 1996, (pp. 1-29).

Linton, Ronald C., "Rule-Based Computational DBMSs," 1991 ACM (7 pages).

Ra, Young-Gook et al., "Towards Supporting Hard Schema Changes in TSE," Dec. 1995 (6 pages).

Dabbas, Russ M. et al., "Mining Semiconductor Manufacturing Data for Productivity Improvement—An Integrated Relational Database Approach," Copyright 2001, Published by Elsevier Science B.V. (16 pages).

Yan, Ling Ling, "Data-Driven Understanding and Refinement of Schema Mappings," ACM SIGMOD May 21-24, 2001, Santa Barbara, California, Copyright 2001 ACM (11 pages).

* cited by examiner

*Primary Examiner*—Tim T. Vo
*Assistant Examiner*—Aaron Sanders
(74) *Attorney, Agent, or Firm*—Perkins Coie LLP

(57) ABSTRACT

A facility for storing extrinsic data is described. The facility receives data associated with a distinguished extrinsic data item of a specified type. The facility determines whether a flexible column directory table contains an entry mapping the distinguished extrinsic data item to a flexible column pool column. If the flexible column directory table does not contain an entry mapping the distinguished extrinsic data item to a flexible column pool column, the facility creates an entry in the flexible column directory table that maps the distinguished extrinsic data item to an available flexible column pool column of the specified type. The facility then copies the received data to the flexible column pool column mapped from the distinguished extrinsic data item.

13 Claims, 20 Drawing Sheets reporting database:                                              column pool table 1 — 1100

| entity id | column 2 | column 3 | column 4 | column 5 |
|---|---|---|---|---|
| 1 | 11 (Seattle) | | 2 (United States) | | — 1111 |
| 2 | 16 (Bellevue) | | 2 (United States) | | — 1112 |
| 3 | 22 (Spokane) | | 4 (Great Britain) | | — 1113 |

⎣— 1101   ⎣— 1102   ⎣— 1103   ⎣— 1104   ⎣— 1105

FIG. 2 transactional database:

extrinsic attribute table — 200

| entity type id | custom field id | custom field name | weighted | multivalued | type |
|---|---|---|---|---|---|
| 1 (task) | 1 | Location | no | no | code |
| 1 (task) | 2 | Needed Skill | yes | yes | code |
| 2 (resource) | 1 | Base of Operations | yes | no | code |

201  202  203  204  205  206

211, 212, 213

FIG. 3 transactional database:

task table, containing date-independent intrinsic attribute values for each task — 300

| task ID | project id | name | start date | finish date | cost | work | task creation time | task date-independent intrinsic attribute modification time | task date-dependent intrinsic attribute modification time |
|---|---|---|---|---|---|---|---|---|---|
| 1 | 1 | management | 01/05/2004 | 01/09/2004 | $3,150 | 36h | 12/1/03 12:00:00 | 12/1/03 12:00:00 | 12/1/03 12:00:00 |
| 2 | 1 | software development | 01/06/2004 | 01/11/2004 | $7,000 | 40h | 12/1/03 12:00:00 | 12/1/03 12:00:00 | 12/1/03 12:00:00 |
| 3 | 1 | documentation | 01/08/2004 | 01/10/2004 | $875 | 2h | 12/1/03 12:00:00 | 12/1/03 12:00:00 | 12/1/03 12:00:00 |

301  302  303  304  305  306  307  308  309  310

311, 312, 313 reporting database:
date-dependent intrinsic attribute data — 400

| task id | time id | cost | work |
|---|---|---|---|
| 1 | 1/5/2004 | $800.00 | 6h |
| 1 | 1/6/2004 | $800.00 | 7h |
| 1 | 1/7/2004 | $550.00 | 11h |
| 1 | 1/8/2004 | $600.00 | 8h |
| 1 | 1/9/2004 | $400.00 | 4h |
| 1 | 1/10/2004 | $0.00 | 0h |
| 1 | 1/11/2004 | $0.00 | 0h |
| 2 | 1/5/2004 | $0.00 | 0h |
| 2 | 1/6/2004 | $1,500.00 | 10h |
| 2 | 1/7/2004 | $1,500.00 | 10h |
| 2 | 1/8/2004 | $1,000.00 | 5h |
| 2 | 1/9/2004 | $1,000.00 | 5h |
| 2 | 1/10/2004 | $1,000.00 | 5h |
| 2 | 1/11/2004 | $1,000.00 | 5h |

*FIG. 4* reporting database:
project update table — 600

| project id | time of last update |
|---|---|
| 1 | 12/1/03 12:00:00 |
| 2 | 12/3/03 9:03:30 |

*FIG. 6* reporting database:
task table, containing date-independent intrinsic attribute values for each task — 700

| task ID | project id | name | start date | finish date | cost | work |
|---|---|---|---|---|---|---|
| 1 | 1 | management | 01/05/2004 | 01/09/2004 | $3,150 | 36h |
| 2 | 1 | software development | 01/06/2004 | 01/11/2004 | $7,000 | 40h |
| 3 | 1 | documentation | 01/04/2004 | 01/10/2004 | $475 | 2h |

*FIG. 7* transactional database:

extrinsic attribute table for attributes of type code 500

| entity type id 501 | entity id 502 | custom field id 503 | custom field value 504 | custom field weight 505 | modification time 506 |
|---|---|---|---|---|---|
| 1 (task) | 1 | 1 (Location) | 11 (Seattle) | | 12/1/03 12:00:00 | 511
| 1 (task) | 2 | 1 (Location) | 16 (Bellevue) | | 12/1/03 12:00:00 | 512
| 1 (task) | 3 | 1 (Location) | 22 (Spokane) | | 12/1/03 12:00:00 | 513
| 1 (task) | 1 | 2 (Needed Skill) | 1 (management) | | 12/1/03 12:00:00 | 514
| 1 (task) | 2 | 2 (Needed Skill) | 4 (C++ programming) | 500 | 12/1/03 12:00:00 | 515
| 1 (task) | 2 | 2 (Needed Skill) | 5 (Visual Basic programming) | 700 | 12/1/03 12:00:00 | 516
| 1 (task) | 2 | 2 (Needed Skill) | 7 (JavaScript programming) | 250 | 12/1/03 12:00:00 | 517
| 1 (task) | 3 | 2 (Needed Skill) | 14 (technical writing) | 559 | 12/1/03 12:00:00 | 518
| 2 (resource) | 1 | 1 (Base of Operations) | 2 (United States) | 850 | 12/1/03 12:00:00 | 519
| 2 (resource) | 2 | 1 (Base of Operations) | 2 (United States) | 700 | 12/1/03 12:00:00 | 520
| 2 (resource) | 3 | 1 (Base of Operations) | 4 (Great Britain) | 1000 | 12/1/03 12:00:00 | 521

*FIG. 5* reporting database: date-dependent intrinsic attribute data 800

| task id | time id | cost | work | |
|---|---|---|---|---|
| 1 | 1/5/2004 | $800.00 | 6h | 811 |
| 1 | 1/6/2004 | $800.00 | 7h | 812 |
| 1 | 1/7/2004 | $550.00 | 11h | 813 |
| 1 | 1/8/2004 | $600.00 | 8h | 814 |
| 1 | 1/9/2004 | $400.00 | 4h | 815 |
| 1 | 1/10/2004 | $0.00 | 0h | 816 |
| 1 | 1/11/2004 | $0.00 | 0h | 817 |
| 2 | 1/5/2004 | $0.00 | 0h | 818 |
| 2 | 1/6/2004 | $1,500.00 | 10h | 819 |
| 2 | 1/7/2004 | $1,500.00 | 10h | 820 |
| 2 | 1/8/2004 | $1,000.00 | 5h | 821 |
| 2 | 1/9/2004 | $1,000.00 | 5h | 822 |
| 2 | 1/10/2004 | $1,000.00 | 5h | 823 |
| 2 | 1/11/2004 | $1,000.00 | 5h | 824 |

801  802  803  804

*FIG. 8* reporting database: extrinsic attribute directory 900

| entity type id | custom field id | custom field name | value column pool column id | weight column pool column id | multivalued | has weight |
|---|---|---|---|---|---|---|
| 1 (task) | 1 | Location | 1 | | no | no |
| 1 (task) | 2 | Needed Skill | 2 | | yes | yes |
| 2 (resource) | 1 | Base of Operations | 3 | 5 | no | yes |

901  902  903  904  905  906  907

911
912
913

*FIG. 9* reporting database:

column pool directory 1000

| column pool column id | table | column number | column type | in use |
|---|---|---|---|---|
| 1 | 1 | 2 | code | yes |
| 2 | 1 | 3 | code | yes |
| 3 | 1 | 4 | code | yes |
| 4 | 1 | 5 | code | no |
| 5 | 2 | 2 | number | yes |
| 6 | 2 | 3 | number | no |
| 7 | 2 | 4 | number | no |
| 8 | 2 | 5 | number | no |

FIG. 11 reporting database:

| entity id | column 2 | column 3 | column 4 | column 5 |
|---|---|---|---|---|
| 1 | 1 (Seattle) | | 2 (United States) | |
| 2 | 16 (Bellevue) | | 2 (United States) | |
| 3 | 22 (Spokane) | | 4 (Great Britain) | | column pool table 1 — 1100
1111, 1112, 1113, 1105, 1104, 1103, 1102, 1101

FIG. 12 reporting database:

| entity id | column 2 | column 3 | column 4 | column 5 |
|---|---|---|---|---|
| 1 | | 850 | | |
| 2 | | 700 | | |
| 3 | | 1000 | | | column pool table 2 — 1200
1211, 1212, 1213, 1205, 1204, 1203, 1202, 1201 reporting database: multivalue grouping table — 1300

| group id | value | weight |
|---|---|---|
| 1 | 1 (Management) | 500 |
| 2 | 4 (C++ programming) | 700 |
| 2 | 5 (Visual Basic programming) | 250 |
| 2 | 7 (JavaScript programming) | 559 |
| 3 | 14 (technical writing) | |

FIG. 13 transactional database:

| entity type id | custom field id | custom field name | weighted | multivalued | type |
|---|---|---|---|---|---|
| 1 (task) | 1 | Location | no | no | code |
| 1 (task) | 2 | Needed Skill | yes | yes | code |
| 2 (resource) | 1 | Base of Operations | yes | no | code |
| 2 (resource) | 2 | Rating | no | no | number | extrinsic attribute table — 1800

*FIG. 18* reporting database:

| entity type id | custom field id | custom field name | value column pool column id | weight column pool column id | multivalued | has weight |
|---|---|---|---|---|---|---|
| 1 (task) | 1 | Location | 1 | | no | no |
| 1 (task) | 2 | Needed Skill | 2 | | yes | yes |
| 2 (resource) | 1 | Base of Operations | 3 | 5 | no | yes |
| 2 (resource) | 2 | Rating | 6 | | no | no | extrinsic attribute directory — 2000

*FIG. 20* reporting database:

| column pool column id | table | column number | column type | in use |
|---|---|---|---|---|
| 1 | 1 | 1 | 2 code | yes |
| 2 | 2 | 1 | 3 code | yes |
| 3 | 3 | 1 | 4 code | yes |
| 4 | 4 | 1 | 5 code | no |
| 5 | 5 | 2 | 2 number | yes |
| 6 | 6 | 2 | 3 number | yes |
| 7 | 7 | 2 | 4 number | no |
| 8 | 8 | 2 | 5 number | no | column pool directory — 1900
1901, 1902, 1903, 1904, 1905
1911, 1912, 1913, 1914, 1915, 1916, 1917, 1918

*FIG. 19* transactional database:

| entity type id | custom field id | custom field name | weighted | multivalued | type |
|---|---|---|---|---|---|
| 1 | 2 | Needed Skill | yes | yes | code |
| 2 | 1 | Base of Operations | yes | no | code | extrinsic attribute table — 2200

*FIG. 22* reporting database:
column pool table 1 — 2300

| entity id | column 2 | column 3 | column 4 | column 5 |
|---|---|---|---|---|
| 1 | | | 2 (United States) | |
| 2 | | | 2 (United States) | |
| 3 | | | 4 (Great Britain) | |

*FIG. 23* reporting database:

| entity type id | custom field id | custom field name | value column pool column id | weight column pool column id | multivalued | has weight |
|---|---|---|---|---|---|---|
| 1 (task) | 2 | Needed Skill | | 2 | yes | yes |
| 2 (resource) | 1 | Base of Operations | 3 | 5 | no | yes | extrinsic attribute directory — 2500

*FIG. 25* reporting database:

| column pool column id | table | column number | column type | in use |
|---|---|---|---|---|
| 1 | 1 | 2 | code | no |
| 2 | 1 | 3 | code | yes |
| 3 | 1 | 4 | code | yes |
| 4 | 1 | 5 | code | no |
| 5 | 2 | 2 | number | yes |
| 6 | 2 | 3 | number | no |
| 7 | 2 | 4 | number | no |
| 8 | 2 | 5 | number | no |

FIG. 24

ADDING EXTRINSIC DATA COLUMNS TO AN EXISTING DATABASE SCHEMA USING A TEMPORARY COLUMN POOL

TECHNICAL FIELD

Embodiments of the present invention are related to the field of database applications, and, more particularly, to the field of application extensibility.

BACKGROUND

It is increasingly common for application programs to store their data in databases. For example, it is common for enterprise-level project scheduling applications like the MICROSOFT PROJECT project scheduling application to do so.

Where an application requires frequent access to data stored in a database, that database is typically optimized for data access transactions. A database optimized in this way is referred to herein as a "transactional database." Where such an application performs rigorous reporting on its data, it is often true that such reporting is not optimally supported by the application's transactional database. In such cases, it is common for the application to cause the data in its transactional database to be replicated to a database optimized for reporting, referred to herein as a "reporting database."

This replication relies on a correspondence between the contents of the transactional database and the reporting database. In general, the contents of these two databases are made to correspond by developing corresponding definitions of the contents of the two databases. These definitions are referred to herein as "schemas." Such schemas typically define the set of fields contained by each of the two databases, and therefore the fields that can be stored and reported on by the application. It is typical for these corresponding schemas to be defined by the application's developer, before the application is shipped to customers.

Despite the best efforts of application developers to (1) anticipate the different kinds of data that customers will want to store and report on with an application and (2) accommodate these kinds of data in the corresponding schemas shipped with the application, it is common for customers to discover a need to store and report on data that is not accommodated in the corresponding schemas shipped with the application. Unfortunately, in the absence of appropriate fields for such data in the shipped schemas, it is often difficult or impossible for a customer to cause the application to store and report on this additional data.

For some applications, it may be possible for the customer to modify both schemas to include customer-defined fields. This approach has a number of disadvantages: First, modifying these schemas often requires a high level of technical proficiency. Second, such modifications may necessitate corresponding modifications to the code of the application, such as (1) modifying code to cause the application to properly store the additional data in the customer-defined fields in the transactional database; (2) modifying code to cause the data in the customer-defined fields in the transactional database to be properly replicated in the reporting database; and (3) modifying code and/or report definitions to cause the data in the customer-defined fields in the reporting database to be properly included in reports produced from the reporting database. Where such modifications are possible, they typically also require a high level of technical proficiency.

In some applications, a few "extra" fields are also included in shipped schemas. To use these extra fields, users must typically manually map the customer-defined fields into the extra fields on the transactional side and manually map the customer-defined fields out of the extra fields on the reporting side. Such manual mapping can make the application much more difficult to use, on an ongoing basis. Also, such extra fields can quickly be exhausted by a customer that wishes to store a number of different kinds of additional data.

In some applications, the delay between data creation in the transactional database and its replication to the reporting database can cause problems. In some cases, an application user can see their data in one part of the system but not in the other due to latency inherent in many approaches to data transfer.

In view of the disadvantages discussed above, a more effective approach to enabling customers of an application to cause the application to store, replicate, and report on additional data would have significant utility.

BRIEF DESCRIPTION OF THE DRAWINGS

FIG. 2 is a table diagram showing sample contents of an extrinsic attribute table used in the transactional database to track the extrinsic attributes that have been created by users.

FIG. 3 is a table diagram showing sample contents for a task table typically maintained in the transactional database.

FIG. 4 is a table diagram showing conceptual sample date-dependent intrinsic attribute data for tasks maintained in the transactional database.

FIG. 5 is a table diagram showing sample contents of an extrinsic attribute table for attributes of the type code maintained in the transactional database.

FIG. 6 is a table diagram showing sample contents of a project update table maintained in the reporting database.

FIG. 7 is a table diagram showing sample contents of a task table maintained by the reporting database.

FIG. 8 is a table diagram showing sample contents of date-dependent intrinsic attribute data maintained in the reporting database.

FIG. 9 is a table diagram showing typical sample contents for an extrinsic attribute directory maintained in the reporting database.

FIG. 10 is a table diagram showing sample contents of a column pool directory maintained in the reporting database.

FIG. 11 is a table diagram showing a first column pool table whose column pool columns can contain the code data type.

FIG. 12 is a table diagram showing sample contents of a second column pool whose column pool columns can contain the number data type.

FIG. 13 is a table diagram showing sample contents of a multivalue grouping table used to represent many-to-many relationships in the database.

FIG. 18 is a table diagram showing the addition of a row to the extrinsic attribute table maintained in the transactional database in response to a user's creation of a new extrinsic attribute.

FIG. 19 is a table diagram showing the column pool directory in the state that reflects the allocation of a value column pool column for the attribute.

FIG. 20 is a table diagram showing the extrinsic attribute directory in a state that reflects the allocation of a weight column pool column.

FIG. 22 is a table diagram showing sample contents of the extrinsic attribute table maintained by the transactional database in a state reflecting removal of an earlier-created extrinsic attribute.

FIG. 23 is a table diagram showing sample contents of the first column pool table in a state reflecting the clearance of column pool columns used by a removed extrinsic attribute.

FIG. 24 is a table diagram showing sample contents of the column pool directory in a state reflecting the deallocation of column pool columns used by a removed extrinsic attribute.

FIG. 25 is a table diagram showing sample contents of the extrinsic attribute directory in a state that reflects the deletion of a removed extrinsic attribute from the extrinsic attribute directory.

DETAILED DESCRIPTION

Figure 1:
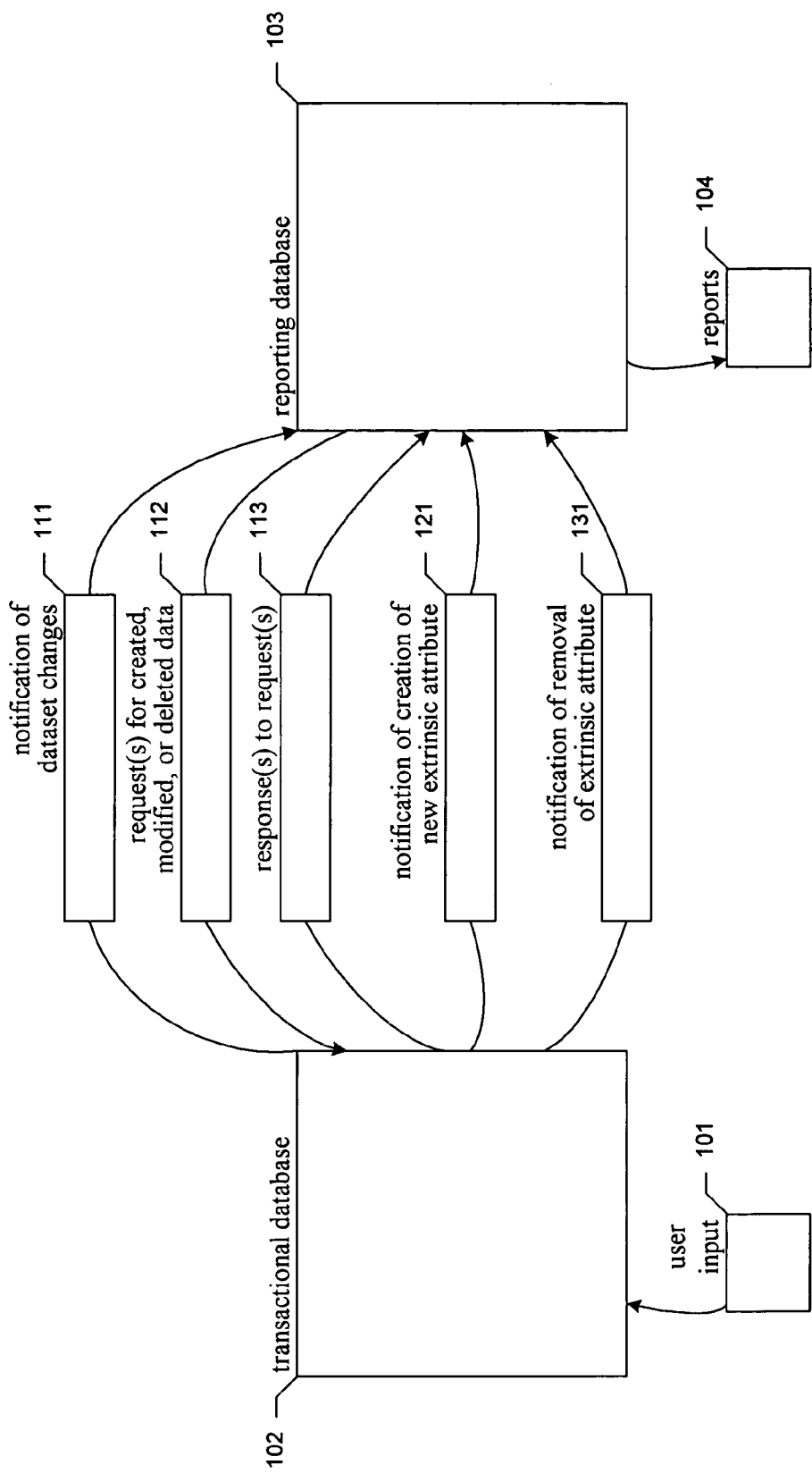
FIG. 1 is a data flow diagram that shows selected typical interactions between a transactional database and a reporting database used by an application.

A software facility that enables a user of an application to expand the set of data stored and reported on by the application to include additional, "extrinsic" data and support near-real-time data replication ("the facility") is described.

In particular, embodiments of the facility provides support for (1) storing the extrinsic data in a transactional database or other data store; (2) transferring the extrinsic data from the transactional data store to one or more reporting databases or other data stores; (3) storing the extrinsic data in the reporting data store or stores; and (4) generating reports from the extrinsic data stored in the reporting data store or stores.

In some embodiments, the facility supports extrinsic data items that are extrinsic attributes of intrinsic data objects, or "entities" defined by the developers of the application that also have intrinsic attributes defined by the developers of the application. As one example, a project scheduling application may include intrinsic entities, such as task entities, each representing a task expected to be performed as part of a project. Task entities can have intrinsic attributes defined by the application's developers, such as a name for the task, a cost attributed to the task, a total amount of work time budgeted to the task, a start date on which performance of the task is scheduled to begin, and an end date on which performance of the task is scheduled to be completed. To these intrinsic attributes for tasks, a user may add extrinsic attributes specific to the user's deployment of the application, such as the location in which the task is to be performed, and a list of skills needed by the person or team that will perform the task.

In some embodiments, the facility employs flexible column pools in the reporting database to store the extrinsic data. These column pools contain columns available for the storage of extrinsic data. The facility dynamically allocates columns from the column pool to extrinsic attributes or other extrinsic data items as they are created by users, and reclaims column pool columns for extrinsic data items as extrinsic data items are deleted by users. In some embodiments, the facility maintains two or more separate database tables for the column pool, called "column pool tables," that can each contain columns for extrinsic data items of different types. In some embodiments, the facility further dynamically manages the supply of column pool columns based upon demand for them.

Some embodiments of the facility support multivalued extrinsic attributes that are capable of containing more than one value. As an example, a user may add to a task data object an extrinsic attribute that is a list of skills needed by the person that will perform the task. For example, for a task object representing a particular computer programming task, the extrinsic skills attribute may include several programming skills, such as C++ programming, Visual Basic programming, and JavaScript programming.

Some embodiments of the facility support weighted extrinsic attributes that include a weight characterizing the extent to which the attribute's value is true. As an example, a user may add to a task data object an extrinsic attribute that is a weighted skill needed by the person that will perform the task. For example, for a task object representing a particular computer programming task, the extrinsic skill attribute may include a weighted programming skill required for the task, such as a score of 700 out of 1000 for C++ programming.

In some embodiments, transfer of the extrinsic data from the transactional database to the reporting database is performed in a near-real-time manner that uses an eventing protocol to initiate transfer in response to changes to the data in the transactional database. In some embodiments, transfer of the extrinsic data from the transactional database to the reporting database is performed incrementally using a system of data timestamps, reducing the time and processing cost of the transfer process.

By supporting the addition of extrinsic data to an application using a replicated database in some or all of the manners described above, the facility tends to make the application both more useful and more usable to its users.

FIG. 1 is a data flow diagram that shows selected typical interactions between a transactional database 102 and a reporting database 103 used by an application. As indicated by the diagram, the transactional database maintains a version of the state of the application that is responsive to user input 101. Through interactions of various types, the state of the application in the transactional database is replicated to the reporting database. The state of the reporting database is, in turn, used to generate reports 104. The transactional database may, for example, be one or more On-Line Transactional Processing ("OLTP") database systems. The reporting database may, for example, be one or more OLTP or On-Line Analytical Processing ("OLAP") database systems. In some embodiments, the state of the application represented in both the transactional and reporting database is organized into distinct data sets, such as data sets each corresponding to a different project being managed using the application.

When certain data is changed in the transactional database, such as creation, modification, or deletion of intrinsic or extrinsic attribute values or their weights or the creation or deletion of an entity instance, the transactional database sends the reporting database a notification 111 that a particular data set has changed. In response, the reporting database typically sends to the transactional database one or more requests 112 for data of the data set that has been created, modified, or deleted in the transactional database since the reporting database last received an update for the data set in question. In response, the transactional database typically sends one or more responses 113 to the request or requests 112. In some embodiments, the reporting database sends separate requests 112 for created, modified, and deleted data; and/or for changed data of different types, such as code, date, flag, duration, number, and text.

When a user creates a new extrinsic attribute in the transactional database, the transactional database sends a notification 121 to the reporting database that contains information about the new extrinsic attribute. When a user removes an extrinsic attribute in the transactional database, the transactional database sends a notification 131 containing information about the removed extrinsic attribute. The communications between the transactional database and the reporting database outlined above are discussed in greater detail below. Those skilled in the art will appreciate that the facility may employ a variety of different data flow schemes, which may vary from the depiction of FIG. 1 in various ways.

FIGS. 2-4 show selected sample initial contents of the transactional database. FIG. 2 is a table diagram showing sample contents of an extrinsic attribute table used in the transactional database to track the extrinsic attributes that have been created by users. The extrinsic attribute table 200 is made up of rows, such as rows 211-213. Each row can correspond to a different extrinsic attribute. In some embodiments, each row is divided into the following columns: an entity type identifier ("ID") column 201; a custom field ID column 202; a custom field name column 203; a weighted column 204; a multivalued column 205; and a type column 206. The entity type ID column contains an identifier that identifies the type of entity to which the extrinsic attribute is attached. In some embodiments, this identifier, and others shown and discussed herein, is a much larger number than is shown, increasing the likelihood that it is unique. For the sake of readability, here and elsewhere, identifiers are sometimes followed by a parenthetical indication of the thing identified by the identifier. For instance, in the entity type ID column of row 211, it is indicated that entity type ID 1 is assigned to the task entity type. The custom field ID column 202 contains an identifier for the extrinsic attribute that differentiates particular extrinsic attributes from other extrinsic attributes created for the same entity type. For example, it can be seen that rows 211 and 212, both corresponding to extrinsic attributes attached to the task entity type, have different custom field IDs. The custom field name column contains a textual name for the extrinsic attribute. The weighted column indicates whether a separate quantitative weight can be stored in conjunction with the value of the extrinsic attribute. The multivalued column indicates whether the extrinsic attribute, for a specific instance of the entity type to which the extrinsic attribute is attached, can simultaneously have more than one value. The type column identifies a data type assigned to the values of the extrinsic attribute. For example, in the type column, row 211 contains the type code, which is typically a foreign key into a lookup table of enumerated values.

Those skilled in the art will appreciate that the table diagram of FIG. 2 and other table diagrams discussed below is depicted in a way designed to make them readily understood, and that actual database tables or other data structures used by the facility may differ in various ways. For example, the facility may use data tables that have larger numbers of columns and/or rows than are shown; that contain fewer or more columns than are shown; that are organized in different ways than shown; that contain data in formats that are different than shown, e.g., that are encoded, compressed, or encrypted in various ways; that distribute data differently between distinct tables; etc.

FIG. 3 is a table diagram showing sample contents for a task table typically maintained in the transactional database. In some embodiments, the task table 300 identifies entity instances that have been created for the entity type task. In some embodiments, the transactional database contains a separate table similar to table 300 for one or more additional entity types. The task table identifies entities that have been created of entity type tasks, as well as some or all of the date independent intrinsic attribute values for each task. In some embodiments, intrinsic attributes of a task may either be date-independent, such that they have the same value for each date during the performance of the task- or date-dependent, such that they may have different values for different dates during the performance of the task. The task table further includes a number of timestamps identifying changes to the intrinsic data associated with each task.

The table is made up of rows, such as rows 311-313. Each row can correspond to a different task. In some embodiments, each row is divided into the following columns: a task ID column 301; a project ID column 302; a name column 303; a start date column 304; a finish date column 305; a cost column 306; a work column 307; a task creation time column 308; a task date-independent intrinsic attribute modification time column 309; and a task date-dependent intrinsic attribute modification time column 310. The task ID column contains an identifier identifying a task. The project ID column contains an identifier identifying a project to which the task belongs. The name column contains a name for the task. The start date and finish date columns respectively contain a start date and a finish date attributed to the task. The cost column contains a monetary cost attributed to the task. The work column contains an amount of work, in time or other units, attributed to the task. The task creation time column 308 identifies the time at which the task was created. The task date-independent attribute modification time indicates the last time that the date-independent intrinsic attributes of the task, such as columns 303-307 of the task table, were modified. The task date-dependent intrinsic attribute modification time column indicates the last time at which date dependent attributes of the task, shown in FIG. 4 and discussed below, were modified. In some embodiments, the timestamp shown in FIG. 3 and in other Figures below are implemented using a time date column, and/or the timestamp SQL data type that is insensitive to time adjustments such as daylight savings time.

FIG. 4 is a table diagram showing conceptual sample date-dependent intrinsic attribute data for tasks maintained in the transactional database. In some project scheduling applications, the data shown in table 400 is not maintained explicitly in the transactional database. Rather, it is derivable from lower-level data stored in the transactional database. Where this is true, generating the date-dependent intrinsic attribute data in the transactional database can sometimes consume considerable resources, increasing the processing cost of replicating this data to the reporting database.

The date-dependent intrinsic attribute data 400 includes rows, such as rows 411-424. Each row can correspond to a different combination of task ID and time ID, and contain each date-dependent intrinsic attribute data value for the task corresponding to the task ID and the time corresponding to the time ID. In the sample data, each row is divided into a task ID column 401 containing the task ID; a time ID column 402, containing the time ID; a cost column 403 containing the cost allocated to the identified task for the identified dates; and a work column 404 containing the amount of work, such as in hours, allocated to the identified task on the identified date. For example, row 411 shows that, for the management task having task ID 1, on 1/5/2004, the cost attribute has the value $800, and the work attribute has the value six hours.

FIG. 5 is a table diagram showing sample contents of an extrinsic attribute table for attributes of the type code maintained in the transaction database. In some embodiments, the transactional database contains tables similar to table 500 for one or more other types supported for extrinsic attributes. The extrinsic attribute table contains rows such as rows 511-521. Each row can correspond to a value for a particular extrinsic attribute for a particular entity instance, such as a particular task to be performed for a particular resource to be employed in a task. Each row can be divided into the following columns: an entity type ID column 501; an entity ID column 502; a custom field ID column 503; a custom field value column 504; a custom field weight column 505; and a modification time column 506. The entity type ID column contains the entity type of the entity instance to which the extrinsic attribute is attached. For example, the entity type ID 1 in row 511 indicates that the row corresponds to a value for an extrinsic attribute attached to an entity instance of the task entity type. The entity ID column contains an identifier corresponding to the entity ID contained in the task ID column of the task table shown in FIG. 3. For example, the fact that the entity ID column in row 511 contains the entity ID 1 shown in the entity ID column of row 511 of the extrinsic attribute table indicates that row 511 corresponds to an extrinsic attribute value attached to the management task described in row 311 of the task table shown in FIG. 3. The custom field ID column contains an identifier that, together with the entity type ID, uniquely identifies a single row of the extrinsic attribute table shown in FIG. 2 to identify the particular extrinsic attribute for which the row provides a value. The custom field value column contains the value stored for the identified extrinsic attribute in the identified entity. For example, the value 11 in the custom field value column of row 511 indicates that the location extrinsic attribute for the management task contains the value 11, which is mapped to the location Seattle in a separate lookup table (not shown). In some embodiments, the facility similarly migrates the contents of these lookup tables from the transactional database to the reporting database (not shown). Column 505 optionally contains a quantitative weight assigned to the extrinsic attribute value, such as a weight on the scale of 0 to 1000. For example, the occurrence of the weight 1000 in the custom field weight column of row 521 indicates that the resource having entity ID 3 has a base of operations in Great Britain with few or no facilities or personnel outside of Great Britain. The modification time column indicates the last time at which the role of the extrinsic attribute table was modified, either by adding the row to the table or changing the contents of the row. In some cases, for multivalued extrinsic attributes, the extrinsic attribute table contains multiple rows for the same entity instance and extrinsic attribute, each representing a different simultaneous value of the multivalued extrinsic attribute. For example, rows 515-517 each represent one of three different values simultaneously assigned to the Needed Skill extrinsic attribute for the software development task having task ID 2.

FIGS. 6-13 contain selected sample contents of the reporting database in a first state corresponding to the state of the transactional database shown in FIGS. 2-5. FIG. 6 is a table diagram showing sample contents of a project update table maintained in the reporting database. The project update table 600 indicates, for at least some of the different projects or other data sets being maintained by the application, the last time that the reporting database received updated information for the project from the transactional database. The project update table is made up of rows, such as rows 611-612. Each row may correspond to a different project. In some embodiments, each row is divided into a project ID column 601 containing an identifier for the project and a time of last update column 602, indicating the last time that the reporting database received updated information for the project from the transactional database. For example, if an update notification was received in the reporting database from the transactional database for the project having project ID 1, the contents of row 611 would cause the reporting database to send update requests to the transactional database containing the last update time 12/01/2003 12:00:00.

FIG. 7 is a table diagram showing sample contents of a task table maintained by the reporting database. It can be seen by comparing task table 600 maintained in the reporting database to task table 200 maintained in the transactional database that these tables contain similar information, with the reporting database task table 700 possibly omitting the timestamps contained in columns 308-310 of the transactional data task table.

FIG. 8 is a table diagram showing sample contents of date-dependent intrinsic attribute data maintained in the reporting database. It can be seen that this date-dependent intrinsic attribute data is similar to that maintained in the transactional database and shown in FIG. 4.

FIGS. 9-13 show tables typically maintained in the reporting database to track extrinsic attributes and their values. FIG. 9 is a table diagram showing sample contents for an extrinsic attribute directory maintained in the reporting database. The extrinsic attribute directory 900 is made up of rows, such as rows 911-913. Each row can correspond to an extrinsic attribute defined by a user. In some embodiments, each row is divided into the following columns: an entity type ID column 901; a custom field ID column 902; a custom field name column 903; a value column pool column ID column 904; a weight column pool column ID column 905; a multivalued column 906; and a has weight column 907. The entity type ID column contains an identifier for the entity type to which the extrinsic attribute is attached. For example, the occurrence of the identifier 1 in the entity type ID column of row 911 indicates that the extrinsic attribute to which row 911 corresponds is attached to the task entity type. The custom field ID column contains a custom field identifier corresponding to one of the custom field identifiers contained in column 202 of the extrinsic attribute table shown in FIG. 2. For example, the entity type ID 1 and custom field ID 1 contained in row 911 indicates that row 911 corresponds to row 211 of the extrinsic attribute table shown in FIG. 2, which also contains the entity type ID of 1 and the custom field ID of 1. The custom field name column contains a textual name for the extrinsic attribute. The value column pool column ID contains an identifier for a column pool column maintained in the reporting database in which values of the location extrinsic attribute are stored. Similarly, the weight column pool column ID column contains an identifier of a column pool column in which the weight of the value of the extrinsic attribute is stored. The column pool column IDs contained in columns 904 and 905 are discussed in greater detail below in connection with FIGS. 10-12. The multivalued column indicates whether the extrinsic attribute may simultaneously have more than one value.

The has weight column indicates whether the value or values of the extrinsic attribute are weighted.

FIG. 10 is a table diagram showing sample contents of a conceptual column pool directory maintained in the reporting database. The column pool directory 1000 is made up of rows, such as rows 1011-1018 Each row can correspond to a column pool column that either has been or can be allocated to an extrinsic attribute value or an extrinsic attribute weight. In some embodiments, each row is divided into the following columns: a column pool column ID column 1001; a table column 1002; a column number column 1003; a column type column 1004; and an in use column 1005. The column pool column ID contains an identifier uniquely identifying the column pool, such as a surrogate key used to relate the entries back to the database table shown in FIG. 9. When the column pool column is allocated to an extrinsic attribute's value or weight, its column pool column ID appears in column 1004 or 1005 of the extrinsic attribute directory. Table column 1002 and column number column 1003 provide information used to locate the column pool column. The table column identifies the database table containing the column pool column, while the column number column identifies the location of the column pool column in that table. For example, the fact that row 1011 contains 1 in the table column and 2 in the column number column indicates that the column pool column to which row 1011 corresponds—that is, the column pool column containing the value of the location extrinsic attribute described in row 1011 on the extrinsic attribute directory—is the second column in the first column pool table, shown in FIG. 11 and discussed below. The column type column indicates the data type or data types that can be stored in the column pool column to which the row corresponds. The in use column indicates whether the column pool column to which the row corresponds has been assigned to a particular extrinsic attribute value or weight. If the in use column contains the value yes, then the column pool column has been assigned. If the in use contains no, then the column pool column has not yet been assigned, and may be assigned to the value or weight of a new extrinsic attribute. For instance, the column pool column having column pool column ID 1 contained in row in 1011 has been assigned, while the column pool having column pool column ID 4 and represented by row 1014 has not been assigned and is available for assignment to a new column pool column value having the data type code. In some embodiments, the in use column is omitted from the column pool directory, as are rows referring to column pool columns not in use. In these embodiments, metadata about all of the column pool columns contained by existing column pool tables maintained by the reporting database are used together with the list of in-use column pool columns in the column pool directory to identify column pool columns not in use that are available for assignment.

FIGS. 11 and 12 are column pool tables containing extrinsic attribute values and/or weights. FIG. 11 is a table diagram showing a first column pool table whose column pool columns can contain the code data type. The first column pool table 1100 is made up of rows, such as rows 1111-1113. Each row can correspond to a different entity ID. In some embodiments, each row is divided into the following columns: an entity ID column 1101; a second column 1102; a third column 1103; a fourth column 1104; and a fifth column 1105. The entity ID column contains the entity ID of the entity instance for which the remaining columns of the column pool table contain extrinsic attribute values and/or weights. For example, the occurrence of entity ID 1 in row 1111 indicates that this row contains extrinsic attribute values and/or weights for entities of any type having entity ID 1, including the management task shown in row 711 of FIG. 7 and a resource (not shown) having the same entity ID. Columns 1102-1105 are column pool columns each containing the values or weights for a particular extrinsic attribute. The further contents of row 1111 indicate that the location extrinsic attribute for the management task has the value 11, which maps to Seattle; the same task has grouping key 1 for looking up the multiple values of the multivalued Needed Skill extrinsic attribute, as is discussed in greater detail below in connection with FIG. 13; and that the Base of Operations attribute for a resource entity having entity ID 1 has the value 2, which maps to the United States. As indicated by row 1114 of the column pool directory shown in FIG. 11, column 5 of the first column pool table is not in use, and is therefore available for assignment to contain the value or weight of a new extrinsic attribute.

FIG. 12 is a table diagram showing sample contents of a second column pool whose column pool columns can contain the number data type. It can be seen that the second column pool is organized in a manner similar to the first column pool, but that it contains different contents, based upon the differing assignment of the two tables' columns via the extrinsic attribute directory and column pool directory.

In some embodiments, each column pool table contain only column pool columns designed to hold a single data type. For example, where the application supports six different data types for extrinsic attributes, each column pool table will contain columns for only one of those six data types. In other embodiments, a single column pool table can contain column pool columns of different types—e.g., a first column pool column in a column pool table may contain the code data type, while a second column pool column in the same column pool table can contain the date column pool type. In additional embodiments, where supported by the database, a single column pool column can support multiple data types. For example, a particular column pool column might be able to contain any of five different data types. In such embodiments, such "type-variant" columns may, for example, be declared as sqlvariant columns, supported by the MICROSOFT SQL SERVER database engine.

The facility typically maintains at least the minimum set of column pool columns needed to contain the values and weights of all of the extrinsic attributes that exist at a given point in time. When new extrinsic attributes exhaust the supply of available column pool columns of the needed types, the facility typically dynamically expands the set of column pool columns, either by adding column pool columns to existing column pool tables, or creating additional column pool tables. In either case, the facility typically adds rows to the column pool directory corresponding to the added column pool columns. When extrinsic attributes are removed by users, the facility typically empties the column pool column or columns assigned to the removed extrinsic attribute and marks these column pool columns in the column pool directory as not in use, and therefore available for reassignment to a new extrinsic attribute. Where the inventory of available column pool columns becomes excessive, the facility typically removes column pool columns from the column pool by deleting column pool columns or column pool tables not in use. In some cases, the facility may reassign column pool columns in such a way that column pool columns assigned to extrinsic attribute values or weights are consolidated in a smaller number of column pool tables, to facilitate the deletion of some column pool tables.

FIG. 13 is a table diagram showing sample contents of a multivalue grouping table. The multivalue grouping table 1300 contains values, and in some cases weights, for multivalued extrinsic attributes. Each row of the multivalue grouping table, such as rows 1311-1315, typically contains an individual value for a multivalued extrinsic attribute. In some embodiments, each row is divided into the following columns: a group ID column 1301 that contains a group ID, also called a "grouping key," that matches a group ID or grouping key stored in the value column pool column of the multivalued extrinsic attribute for which the row contains a value; a value column 1312 that contains a value for the identified combination of extrinsic attribute and entity instance; and a weight column 1303 that, for multivalued extrinsic attributes that are weighted, can contain a weight for the value. For example, the contents of rows 1312-1314 show that the Needed Skills extrinsic attribute for the software development task having task ID 2, mapped to grouping key 2 in column 1303 of row 1312 in the first column pool table 1300 shown in FIG. 13 has the following three values, with the weights shown: C++ programming, 500; Visual Basic programming, 700; and JavaScript programming, 500.

In some embodiments, the facility defines views of the application data in the reporting database that include some columns containing intrinsic attribute values, such as those stored in the task table 700 shown in FIG. 7 and the date-dependent intrinsic attribute data 800 shown in FIG. 8, as well as extrinsic attributes listed in extrinsic attribute directory 900 shown in FIG. 9 whose data and weights are shown in column pool tables such as column pool tables 1100 and 1200 shown in FIGS. 11 and 12. Users can straightforwardly create reports from such consolidated views that include together both intrinsic and extrinsic attributes of application entities without having knowledge of the underlying column pool column mappings. Using a view to access the extrinsic data conceals the underlying implementation, protecting the user from change as well as complexity. For example, for the sample data depicted in FIGS. 7-14, the facility may present a reporting view of the task entity containing the following columns, some of which correspond to intrinsic attributes of the task entity type and others of which correspond to extrinsic attributes of the task entity type: Task ID, Project ID, Task Name, Start Date, Finish Date, Cost, Work, Location, and Needed Skill.

Figure 14:
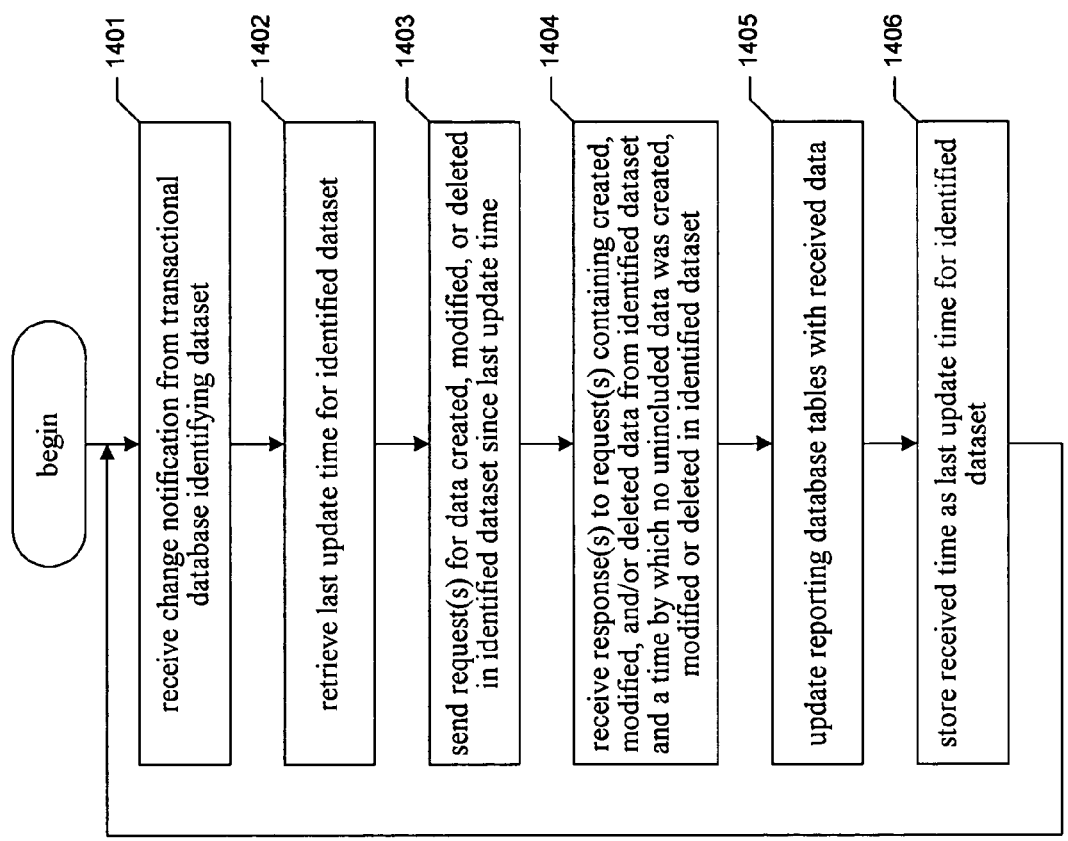
FIG. 14 is a flow diagram showing steps typically performed by the facility to process change notifications received from the transactional database by the reporting database.

FIG. 14 is a flow diagram showing steps typically performed by the facility to process change notifications received from the transactional database by the reporting database. In step 1401, the facility receives a change notification from the transactional database identifying a particular project, or other data set, whose data has changed. In step 1402, the facility retrieves from the project update table shown in FIG. 6 the time of last update for the project identified in the change notification received in step 1401. In step 1403, the facility sends one or more requests for data created, modified, or deleted in the data set identified in the request since the last update time retrieved in step 1402. In step 1404, the facility receives one or more responses to the requests sent in step 1401. The responses contain data created, modified, or deleted from the identified data set. The responses also contain a time after which any creation, modification, or deletion of data not included in the received responses could have occurred. In step 1405, the facility updates the tables in the reporting database with the data contained in the responses received in step 1404. Step 1405 is discussed in more detail below in connection with FIGS. 15, 16, and 26. In step 1406, the facility stores the time received in step 1404 in the project update table 600 shown in FIG. 6 as the last update time for the identified data set. After step 1406, the facility continues in step 1401 to receive the next change notification. Those skilled in the art will appreciate that the steps shown in FIG. 14 and in the flow diagrams discussed below may be altered in a variety of ways. For example, the order of the steps may be rearranged, steps may be performed at different levels of granularity, steps may be parallelized or serialized, shown steps may be omitted, additional steps may be included, etc.

In some embodiments, the requests sent in step 1403 include requests for changes to date-independent intrinsic attribute values, date-dependent intrinsic attribute values, and extrinsic attribute values. To respond to these requests, the transactional database searches the task table and corresponding entity tables for other entity types, and the extrinsic attribute table maintained in the transactional database for creation or modification times that are later than the last update time specified in the requests. For rows of these tables that do have later times, the facility typically includes the information from those rows (other than the timestamps contained by the rows) in the response sent to the reporting database. The facility also includes in the responses a contemporaneous time, such as the present time, so that responses to future requests from the reporting database will only contain any of these rows that were changed since the last response was sent. In this way, the amount of data that must be replicated to the reporting database may be considerably reduced, thus providing near-real-time data availability in the reporting database.

Where a row is deleted from any of the transactional database tables, the transactional database typically records an indication of the deletion that can be passed on to the reporting database in the next request response. For example, some or all of the tables may have an additional column, not shown, containing a deleted flag that is set when a row is deleted, which is passed on to the reporting database. Alternatively, transactional database table rows can actually be deleted, and their deletion can be noted in one or more deleted row logs maintained by the transactional database. The contents of this log can be included in responses to requests from the reporting database for deleted data.

The processing of information in responses relating to creation, modification, or deletion of information relating to intrinsic attributes is straightforward, and involves appropriate modifications to the entity table—such as task table 700 shown in FIG. 7—and date-dependent intrinsic attribute data shown in FIG. 8 maintained in the reporting database.

Figure 15:
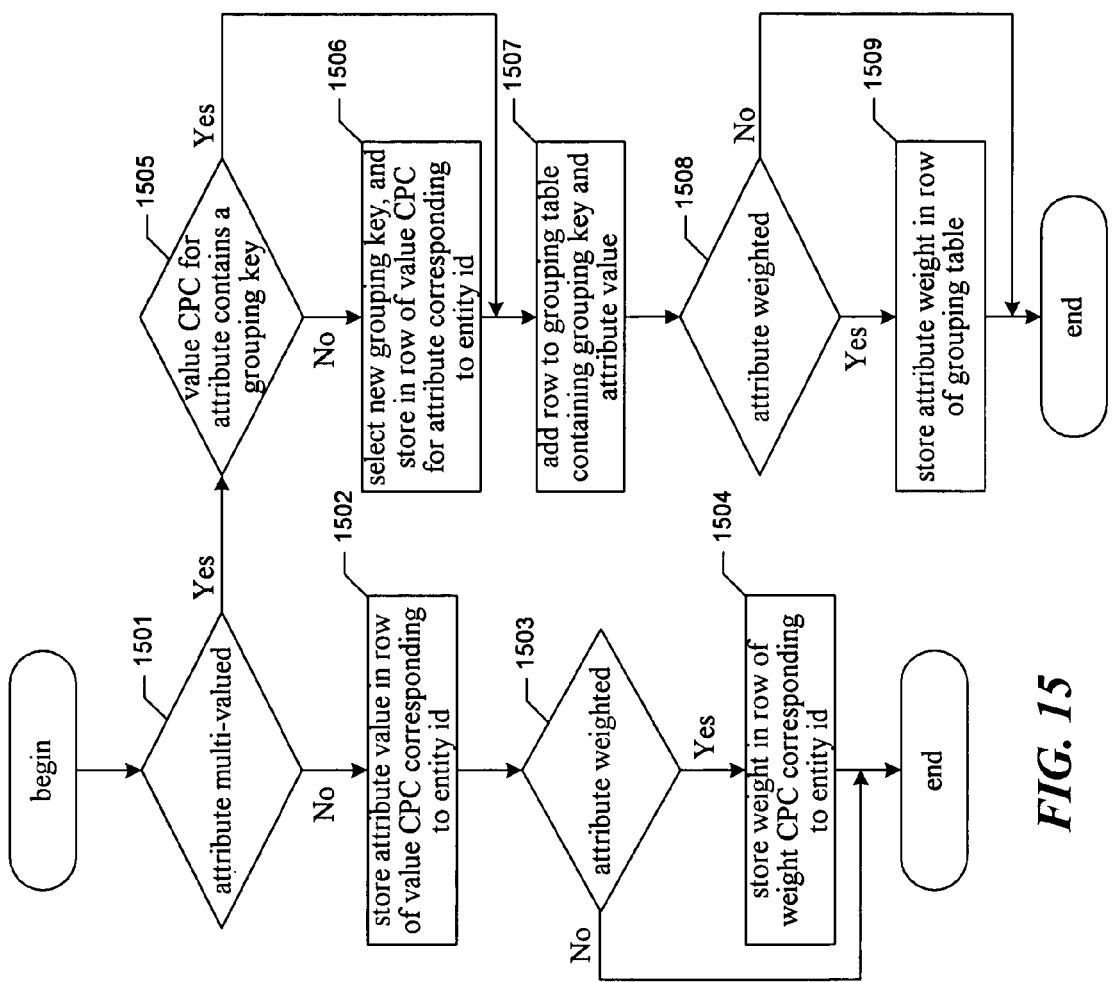
FIG. 15 is a flow diagram showing steps typically performed by the facility in order to process the creation or modification of an extrinsic attribute value or weight indicated by a response sent from the transactional database.
Figure 16:
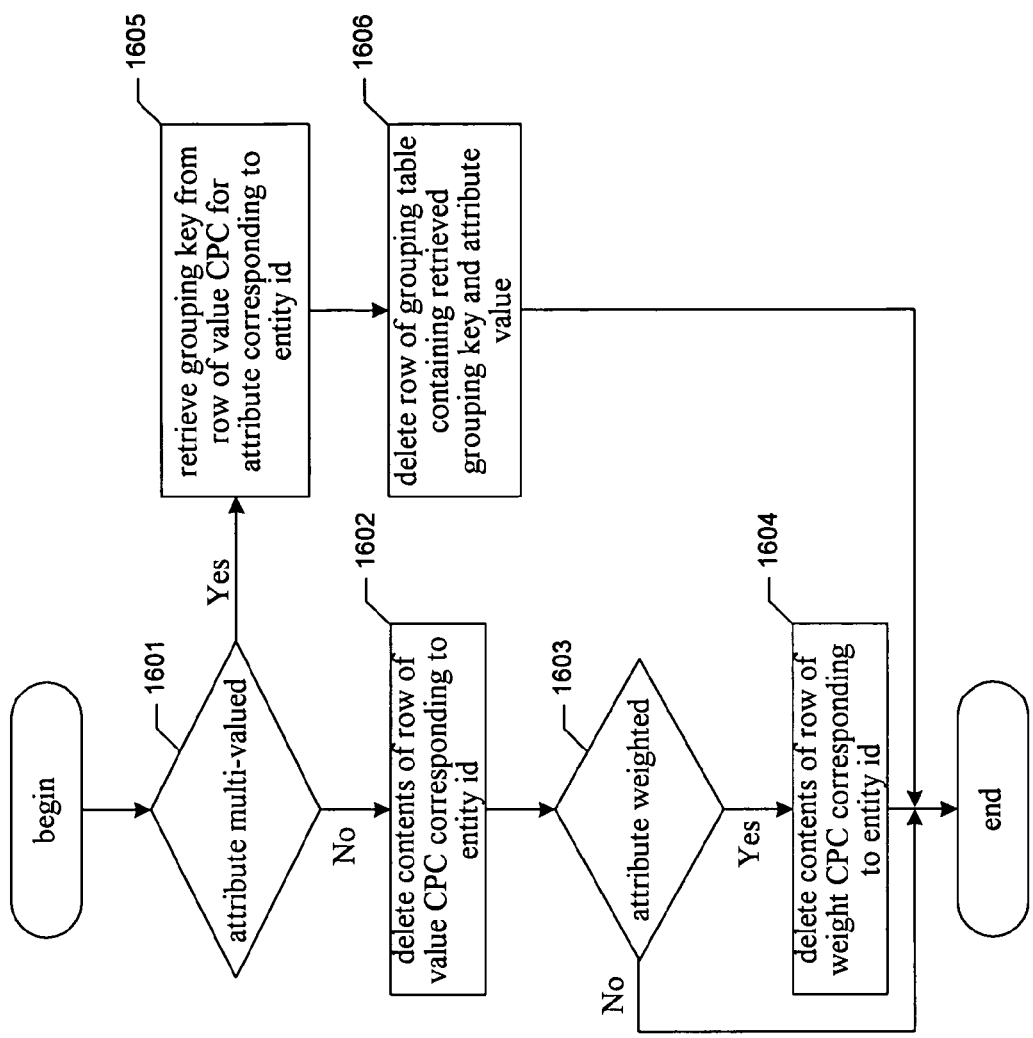
FIG. 16 is a flow diagram showing steps typically performed by the facility in order to process an indication received in an update response of a deleted extrinsic attribute value.

FIGS. 15 and 16 show processing performed by the facility to process the creation, modification, or deletion of extrinsic attribute values and/or weights. FIG. 15 is a flow diagram showing steps typically performed by the facility in order to process the creation or modification of an extrinsic attribute value or weight indicated by a response sent from the transactional database. In step 1501, if the attribute is multi-valued, then the facility continues in step 1505, else the facility continues in step 1502. In step 1502, the facility stores the attribute value specified in the update response in the row of the column pool column ("CPC") assigned to the value of the attribute that corresponds to the entity ID contained in the update response. In step 1503, if the attribute is weighted, then the facility continues in step 1504, else the steps conclude. In step 1504, the facility stores the weight specified by the update response in the row of the column pool column assigned to the weight of the extrinsic attribute that corresponds to the specified entity ID. After step 1504, these steps conclude.

In step 1505, if the value column pool column assigned to the attribute contains a grouping key in the row corresponding to the specified entity ID, then the facility continues in step 1507, else the facility continues in step 1506. In step 1506, the facility selects a new grouping key, and stores it in the row of the value column pool column for the attribute that corresponds to the entity ID. After step 1506, the facility continues in step 1507. In step 1507, the facility adds a row to the grouping table containing the grouping key for the entity ID and the attribute value specified by the update response. In step 1508, if the specified attribute is weighted, then the facility continues in step 1509, else the steps conclude. In step 1509, the facility stores the specified attribute weight in the row added to the grouping table in step 1507. After step 1509, these steps conclude.

FIG. 16 is a flow diagram showing steps typically performed by the facility in order to process an indication received in an update response of a deleted extrinsic attribute value. In step 1601, if the attribute is multivalued, then the facility continues in step 1605, else the facility continues in step 1602. In step 1602, the facility deletes the contents of the row of the value column pool column of the attribute that corresponds to the specified entity ID. In step 1603, if the attribute is weighted, then the facility continues in step 1604, else these steps conclude. In step 1604, the facility deletes the contents of the row of the weight column pool column for the attribute corresponding to the entity ID. After step 1604, these steps conclude.

In step 1605, the facility retrieves the grouping key from the row of the value column pool column for the attribute that corresponds to the specified entity ID. In step 1606, the facility deletes the row of the grouping table containing the retrieved grouping key and the specified attribute value. After step 1606, these steps conclude.

Figure 17:
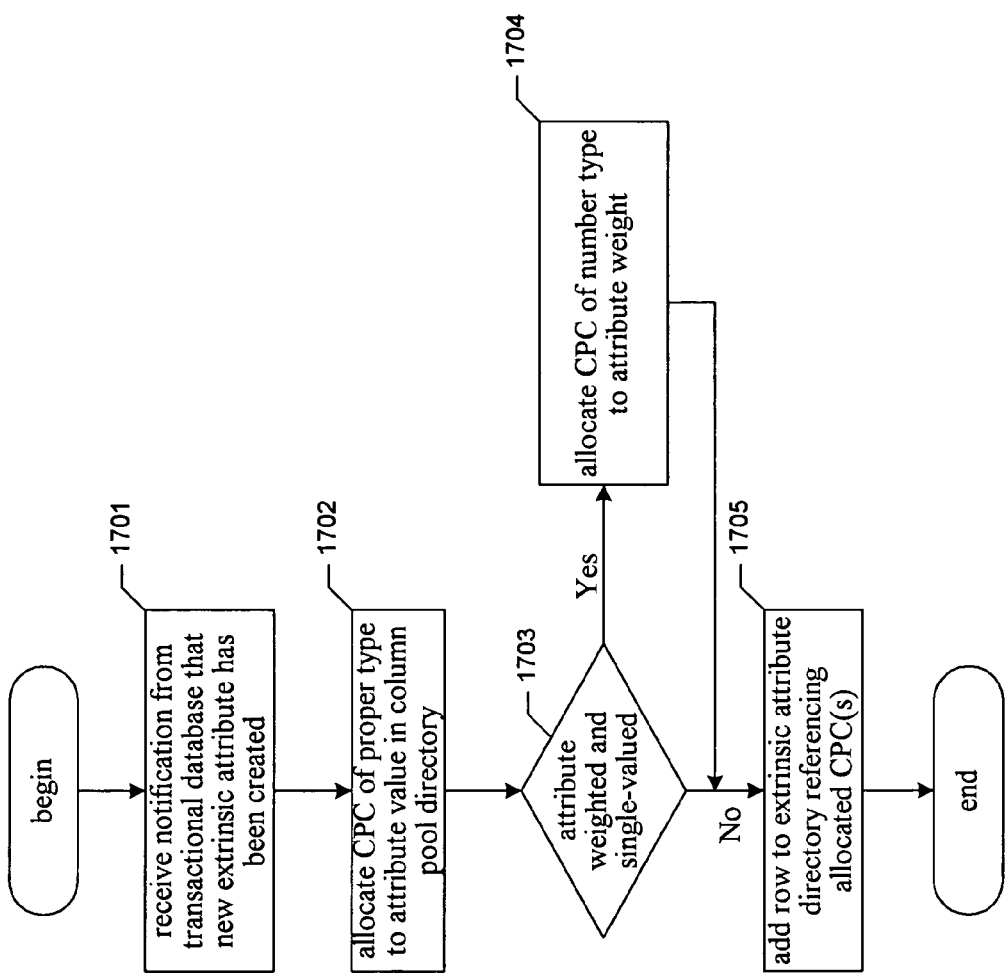
FIG. 17 is a flow diagram showing steps typically performed by the facility when a notification of creation of a new extrinsic attribute is received by the reporting database.

FIGS. 17-26 show the processing of notifications 121, 131, and 141 shown in FIG. 1. FIG. 17 is a flow diagram showing steps typically performed by the facility when a notification of creation of a new extrinsic attribute is received by the reporting database. Such a notification typically includes information describing the new extrinsic attribute. In some embodiments, however, the notification does not contain all information about the new extrinsic attribute needed by the reporting database, and the reporting database initiates a request/response cycle similar to request 112 and response 113 to collect any additional information needed by the reporting database about the new extrinsic attribute.

In step 1701, the facility receives a notification from the transactional database that a new extrinsic attribute has been created. Typically, this occurs when a user uses a user interface provided by the application to define a new extrinsic attribute and attach it to a particular entity type. In response, the facility (1) adds a row to the extrinsic attribute table maintained in the transactional database, and (2) sends such a notification from the transactional database to the reporting database.

FIG. 18 is a table diagram showing the addition of a row to the extrinsic attribute table maintained in the transactional database in response to a user's creation of a new extrinsic attribute. It can be seen by comparing extrinsic attribute table 1800 shown in FIG. 18 to extrinsic attribute table 200 shown in FIG. 2 that the facility has added a new row 1814 to the extrinsic attribute table 1800 that defines a new Rating extrinsic attribute that is attached to the resource entity type, assigned a custom field ID of 2, is not weighted, is not multivalued, and is of the number data type.

In step 1702, the facility allocates a column pool column of the proper data type to the value of the new extrinsic attribute in the column pool directory.

FIG. 19 is a table diagram showing the column pool directory in the state that reflects the allocation of step 1702. It can be seen by comparing column pool directory 1900 shown in FIG. 19 to column pool directory 1000 shown in FIG. 10 that the facility has changed the contents of the in use column 1905 in row 1916 from no to yes to reflect to the assignment of the column pool column corresponding to row 1916 and having column pool column ID 6 to the value for the new attribute. It should be noted that this column pool column is among those column pool columns catalogued in the column pool directory having the proper column type for the value of the new extrinsic attribute, the number data type.

In step 1703, if the new attribute is weighted and single-valued, then the facility continues in step 1704, else there is no need to assign a weight column from the pool, so the facility continues in step 1705. In step 1704, the facility allocates a column pool column of the type number to the weight for the new attribute. After step 1704, the facility continues in step 1705. In step 1705, the facility adds a row to the extrinsic attribute directory to reference the column pool columns allocated in step 1702, and, in some cases, in step 1704. After step 1705, these steps conclude.

FIG. 20 is a table diagram showing the extrinsic attribute directory in a state that reflects the allocation of step 1705. It can be seen by comparing extrinsic directory 2000 shown in FIG. 20 to extrinsic attribute directory 900 shown in FIG. 9 that the facility has added a new row 2014 to extrinsic attribute directory 2000 corresponding to the new Rating extrinsic attribute and containing the column pool column ID 6 in its value pool column ID column.

Figure 21:
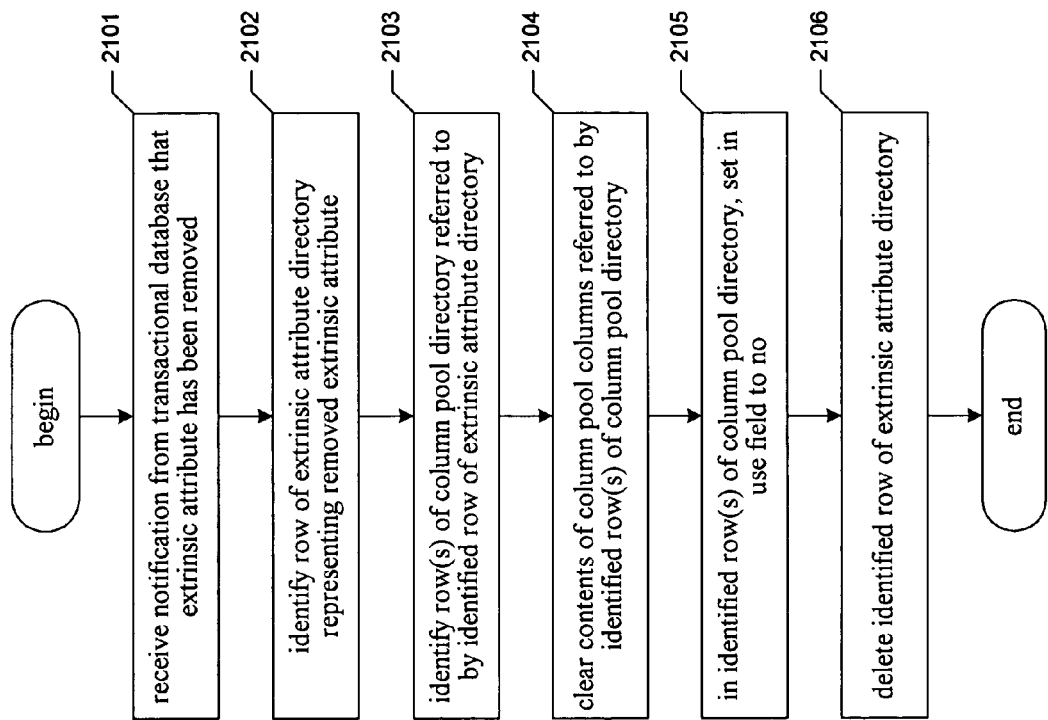
FIG. 21 is a flow diagram showing steps typically performed by the facility to process a notification of the removal of an extrinsic attribute received by the reporting database from the transactional database.

FIG. 21 is a flow diagram showing steps typically performed by the facility to process a notification of the removal of an extrinsic attribute received by the reporting database from the transactional database. In step 2101, the facility receives a notification from the transactional database that a particular extrinsic attribute has been removed. The transactional database sends such a notification when the user uses a user interface provided by the application to delete an extrinsic attribute earlier created by a user. In response, the transactional database (1) updates the extrinsic attribute table maintained in the transactional database, and (2) sends such a notification to the reporting database. Such a notification typically includes information describing the removed extrinsic attribute. In some embodiments, however, the notification does not contain all information about the removed extrinsic attribute needed by the reporting database, and the reporting database initiates a request/response cycle similar to request 112 and response 113 to collect any additional information needed by the reporting database about the removed extrinsic attribute.

FIG. 22 is a table diagram showing sample contents of the extrinsic attribute table maintained by the transactional database in a state reflecting removal of an earlier-created extrinsic attribute. By comparing extrinsic attribute table 2200 shown in FIG. 22 to extrinsic attribute table 200 shown in FIG. 2, it can be seen that the facility has deleted row 211 shown in FIG. 2 corresponding to the Location extrinsic attribute.

In step 2102, the facility identifies a row of extrinsic attribute directory representing the removed extrinsic attribute. In the example, this is row 911 of extrinsic attribute directory 900 shown in FIG. 9. In step 2103, the facility identifies any rows of the column pool directory referred to by the identified row of the extrinsic attribute directory; that is, any rows of the column pool directory referred to by column pool column IDs contained in the value column pool column ID column or weight column pool column ID column of the identified row of the extrinsic attribute directory. In the example, the facility identifies row 1011 of column pool directory 1000 shown in FIG. 10, which contains column pool column ID 1 contained in the value column pool column ID column of row 911 of the extrinsic attribute directory 900. In step 2104, the facility clears the contents of the column pool columns referred to by the identified rows of the column pool directory. In the example, the facility deletes the contents of column 2 of the first column pool table, referred to in identified row 1011 of the column pool directory 1000.

FIG. 23 is a table diagram showing sample contents of the first column pool table in a state reflecting performance of step 2104. It can be seen by comparing first column pool table 2300 shown in FIG. 23 with first column pool table 1100 shown in FIG. 11 that the facility has deleted the data formerly contained in column 1102 of first column pool table 1100.

In step 2105, in the identified rows of the column pool directory, the facility sets the in use field to no.

FIG. 24 is a table diagram showing sample contents of the column pool directory in a state reflecting performance of step 2105. It can be seen by comparing column pool directory 2400 shown in FIG. 24 to column pool directory 1000 shown in FIG. 10 that the facility has changed the contents of the in use column of row 2411 from yes to no to reflect that this column pool column is no longer in use, and is available for reassignment.

In step 2106, the facility deletes the identified row of the extrinsic attribute directory. After step 2106, these steps conclude.

FIG. 25 is a table diagram showing sample contents of the extrinsic attribute directory in a state that reflects performance of step 2106. It can be seen by comparing extrinsic attribute directory 2500 shown in FIG. 25 to extrinsic attribute directory 900 shown in FIG. 9 that the facility has deleted selected row 911 shown in FIG. 9 corresponding to the removed Location attribute.

Figure 26:
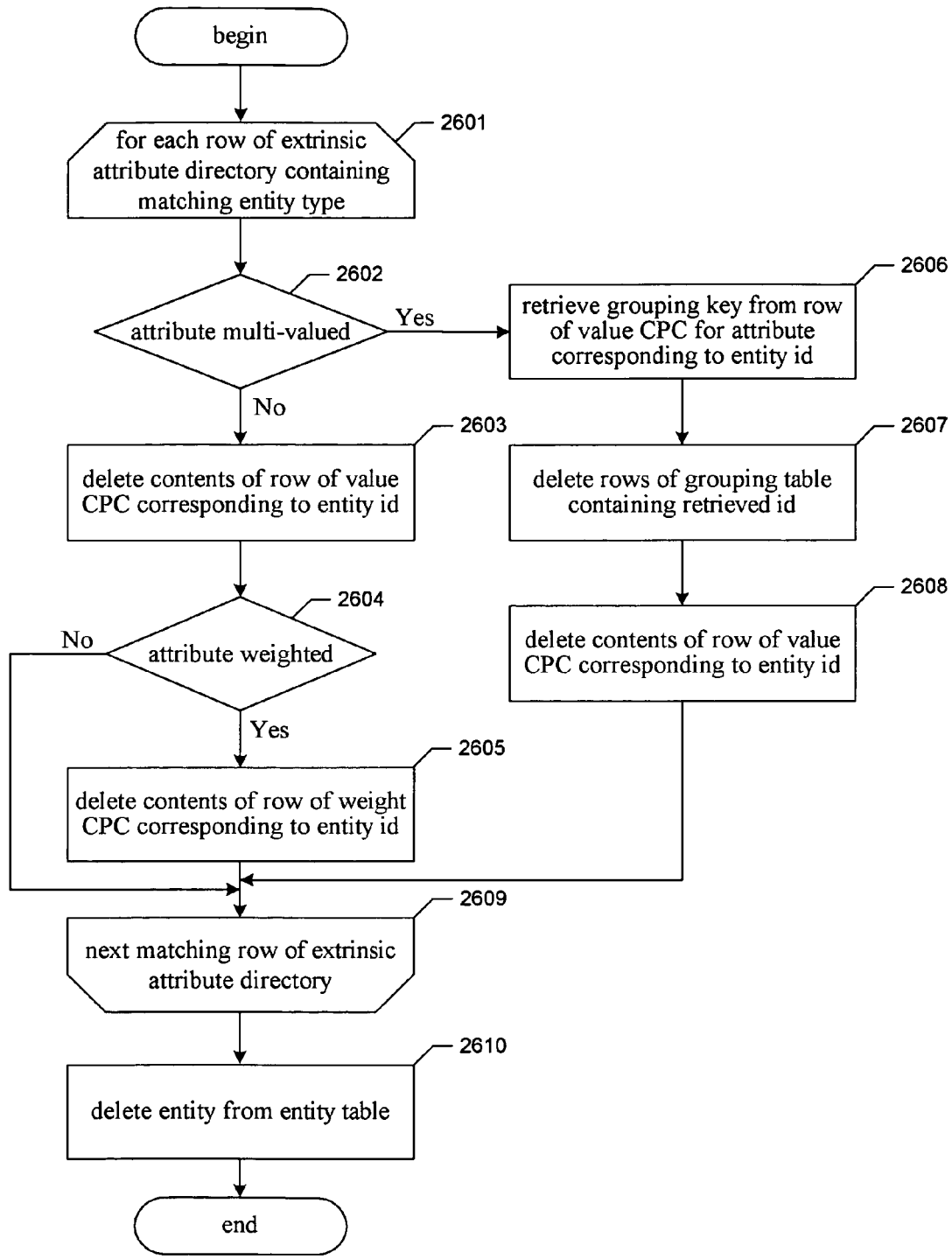
FIG. 26 is a flow diagram showing in greater detail steps typically performed by the facility in order to process the deletion of an entity instance in the reporting database.

FIG. 26 is a flow diagram showing steps typically performed by the facility in order to process the deletion of an entity instance in the reporting database. These steps are typically included in the processing performed as part of step 1405 shown in FIG. 4 when an entity instance is deleted in the transactional database. An entity instance may be deleted when a user uses a user interface provided by the application to delete an existing entity instance, such as a particular task. For example, the user may use the user interface to delete the task called "documentation." In response, the transactional database typically both (1) deletes the row representing the deleted task from the entity table for the entity type of the deleted entity instance, such as the task table, maintained by the transactional database—in the example, the facility would delete row 313 shown in FIG. 3, corresponding to the documentation task (not shown)—and (2) timestamps the deletion for inclusion in the next response 113.

In steps 2601-2609, the facility loops through each row of the extrinsic attribute directory containing an entity type that matches the entity type of the deleted entity instance. In the example, because the deleted documentation task is of the task entity type, the facility loops through rows 911 and 912 of extrinsic attribute directory 900 shown in FIG. 9, which each contain the entity type ID for the task entity type. In step 2602, if the present extrinsic attribute is multivalued, then the facility continues in step 2606, else the facility continues in step 2603. In step 2603, the facility deletes the contents of the row of the value column pool column corresponding to the entity ID of the deleted entity instance. For the iteration of the loop corresponding to row 911, the facility deletes the value 22 for Spokane from column 1102 of row 1103 in the first column pool table 1100 (not shown). In step 2604, if the deleted attribute instance is weighted, then the facility continues in step 2605, else the facility continues in step 2609. In step 2605, the facility deletes the contents of the row of the weight column pool column corresponding to the entity ID of the deleted entity instance. After step 2605, the facility continues in step 2609.

In step 2606, the facility retrieves the grouping key from the row of the value column pool column for the attribute that corresponds to the entity ID of the deleted entity instance. In the iteration of the loop for row 912, the facility retrieves the grouping key 3 from column 1103 of row 1113 in the first column pool table 1100 (not shown). In step 2607, the facility deletes rows of the grouping table containing the retrieved ID. In the iteration of the loop for row 912 of the extrinsic attribute directory, the facility deletes row 1315 from multi-value grouping table 1300, as it contains group ID 3 (not shown). In step 2608, the facility deletes the contents of the row of the value column pool column corresponding to the entity ID of the deleted entity instance. For the iteration of the loop corresponding to row 911, the facility deletes the value 22 for Spokane from column 1102 of row 1103 in the first column pool table 1100 (not shown). After step 2608, the facility continues in step 2609. In step 2609, if additional matching rows of the extrinsic attribute directory remain to be processed, the facility continues in step 2601 to process the next such row, else the facility continues in step 2610. In step 2610, the facility deletes the entity from the transactional database's entity table. After step 2610, these steps conclude.

Figure 27:
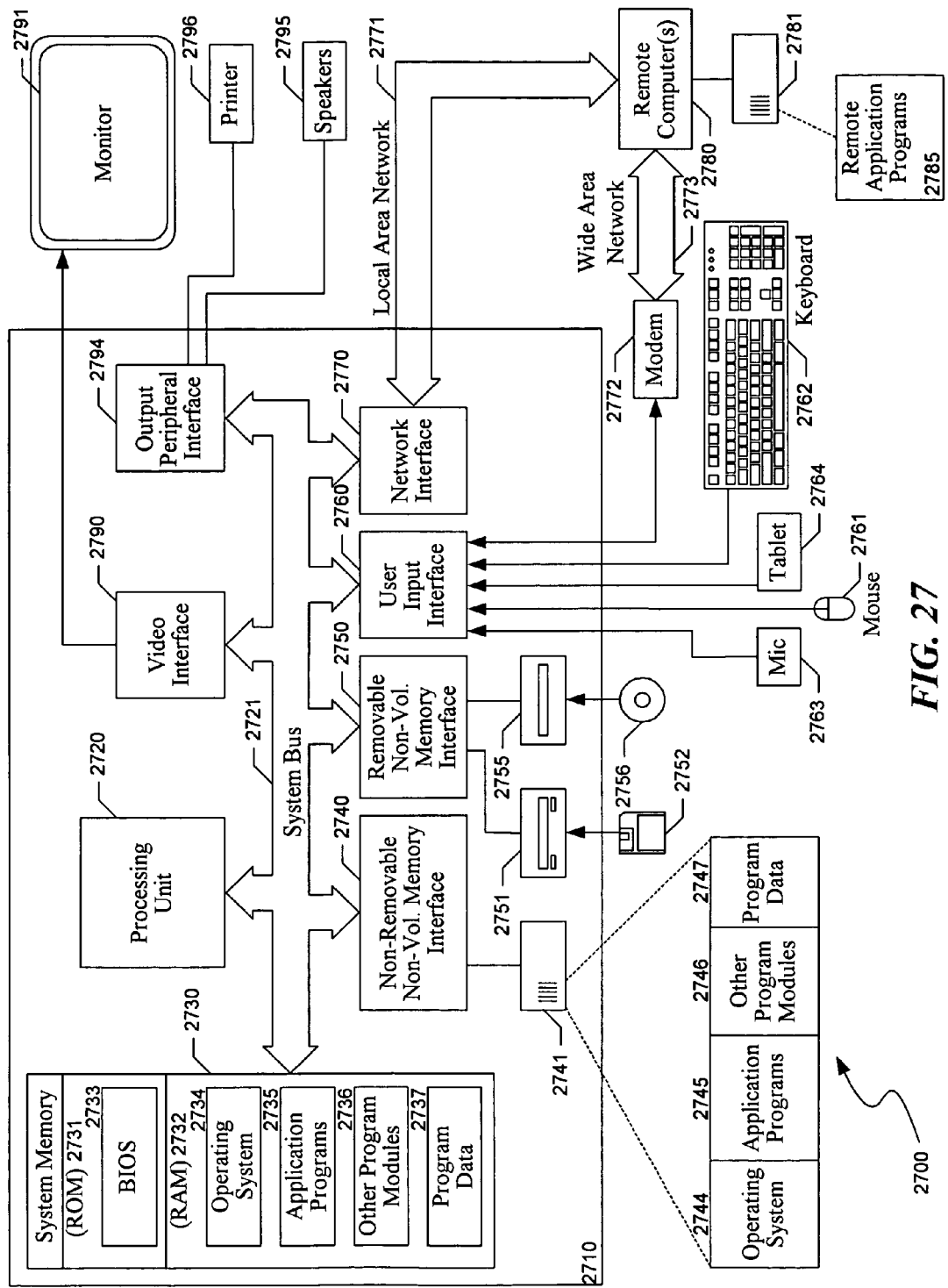
FIG. 27 is a block diagram that illustrates an example of a suitable computing system environment in which the facility may be implemented.

FIG. 27 is a block diagram that illustrates an example of a suitable computing system environment 2700 in which the facility may be implemented. For example, the transactional database 1702 and the reporting database 1703 may each be resident in and/or operated on by one or more of the computers 2710 shown in FIG. 27. The computing system environment 2700 is only one example of a suitable computing environment and is not intended to suggest any limitation as to the scope of use or functionality of the facility. Neither should the computing environment 2700 be interpreted as having any dependency or requirement relating to any one or combination of components illustrated in the exemplary operating environment 2700.

The facility is operational with numerous other general purpose or special purpose computing system environments or configurations. Examples of well known computing systems, environments, and/or configurations that may be suitable for use with the facility include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The facility may be described in the general context of computer-executable instructions, such as program modules, being executed by a computer. Generally, program modules include routines, programs, objects, components, data structures, and so forth, which perform particular tasks or implement particular abstract data types. The facility may also be practiced in distributed computing environments where tasks are performed by remote processing devices that are linked through a communications network. In a distributed computing environment, program modules may be located in local and/or remote computer storage media including memory storage devices.

With reference to FIG. 27, an exemplary system for implementing the facility includes a general purpose computing device in the form of a computer 2710. Components of the computer 2710 may include, but are not limited to, a processing unit 2720, a system memory 2730, and a system bus 2721 that couples various system components including the system memory to the processing unit 2720. The system bus 2721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 2710 typically includes a variety of computer-readable media. Computer-readable media can be any available media that can be accessed by the computer 2710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 2710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 2730 includes computer storage media in the form of volatile and/or nonvolatile memory such as read only memory (ROM) 2731 and random access memory (RAM) 2732. A basic input/output system 2733 (BIOS), containing the basic routines that help to transfer information between elements within computer 2710, such as during start-up, is typically stored in ROM 2731. RAM 2732 typically contains data and/or program modules that are immediately accessible to and/or presently being operated on by processing unit 2720. By way of example, and not limitation, FIG. 27 illustrates operating system 2734, application programs 2735, other program modules 2736 and program data 2737.

The computer 2710 may also include other removable/non-removable, volatile/nonvolatile computer storage media. By way of example only, FIG. 27 illustrates a hard disk drive 2741 that reads from or writes to non-removable, nonvolatile magnetic media, a magnetic disk drive 2751 that reads from or writes to a removable, nonvolatile magnetic disk 2752, and an optical disk drive 2755 that reads from or writes to a removable, nonvolatile optical disk 2756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2741 is typically connected to the system bus 2721 through a non-removable memory interface such as interface 2740, and magnetic disk drive 2751 and optical disk drive 2755 are typically connected to the system bus 2721 by a removable memory interface, such as interface 2750.

The drives and their associated computer storage media, discussed above and illustrated in FIG. 27, provide storage of computer-readable instructions, data structures, program modules and other data for the computer 2710. In FIG. 27, for example, hard disk drive 2741 is illustrated as storing operating system 2744, application programs 2745, other program modules 2746 and program data 2747. Note that these components can either be the same as or different from operating system 2734, application programs 2735, other program modules 2736, and program data 2737. Operating system 2744, application programs 2745, other program modules 2746, and program data 2747 are given different numbers herein to illustrate that, at a minimum, they are different copies. A user may enter commands and information into the computer 2710 through input devices such as a tablet, or electronic digitizer, 2764, a microphone 2763, a keyboard 2762 and pointing device 2761, commonly referred to as mouse, trackball or touch pad. Other input devices not shown in FIG. 27 may include a joystick, game pad, satellite dish, scanner, or the like. These and other input devices are often connected to the processing unit 2720 through a user input interface 2760 that is coupled to the system bus, but may be connected by other interface and bus structures, such as a parallel port, game port or a universal serial bus (USB). A monitor 2791 or other type of display device is also connected to the system bus 2721 via an interface, such as a video interface 2790. The monitor 2791 may also be integrated with a touch-screen panel or the like. Note that the monitor and/or touch screen panel can be physically coupled to a housing in which the computing device 2710 is incorporated, such as in a tablet-type personal computer. In addition, computers such as the computing device 2710 may also include other peripheral output devices such as speakers 2795 and printer 2796, which may be connected through an output peripheral interface 2794 or the like.

The computer 2710 may operate in a networked environment using logical connections to one or more remote computers, such as a remote computer 2780. The remote computer 2780 may be a personal computer, a server, a router, a network PC, a peer device or other common network node, and typically includes at least some of the elements described above relative to the computer 2710, although only a memory storage device 2781 has been illustrated in FIG. 27. The logical connections depicted in FIG. 27 include a local area network (LAN) 2771 and a wide area network (WAN) 2773, but may also include other networks. Such networking environments are commonplace in offices, enterprise-wide computer networks, intranets and the Internet. For example, in the present facility, the computer system 2710 may comprise source machine from which data is being migrated, and the remote computer 2780 may comprise the destination machine. Note however that source and destination machines need not be connected by a network or any other means, but instead, data may be migrated via any media capable of being written by the source platform and read by the destination platform or platforms.

When used in a LAN networking environment, the computer 2710 is connected to the LAN 2771 through a network interface or adapter 2770. When used in a WAN networking environment, the computer 2710 typically includes a modem 2772 or other means for establishing communications over the WAN 2773, such as the Internet. The modem 2772, which may be internal or external, may be connected to the system bus 2721 via the user input interface 2760 or other appropriate mechanism. In a networked environment, program modules depicted relative to the computer 2710, or portions thereof, may be stored in the remote memory storage device. By way of example, and not limitation, FIG. 27 illustrates remote application programs 2785 as residing on memory device 2781. It will be appreciated that the network connections shown are exemplary and other means of establishing a communications link between the computers may be used.

While various functionalities and data are shown in FIG. 27 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

Figure 28:
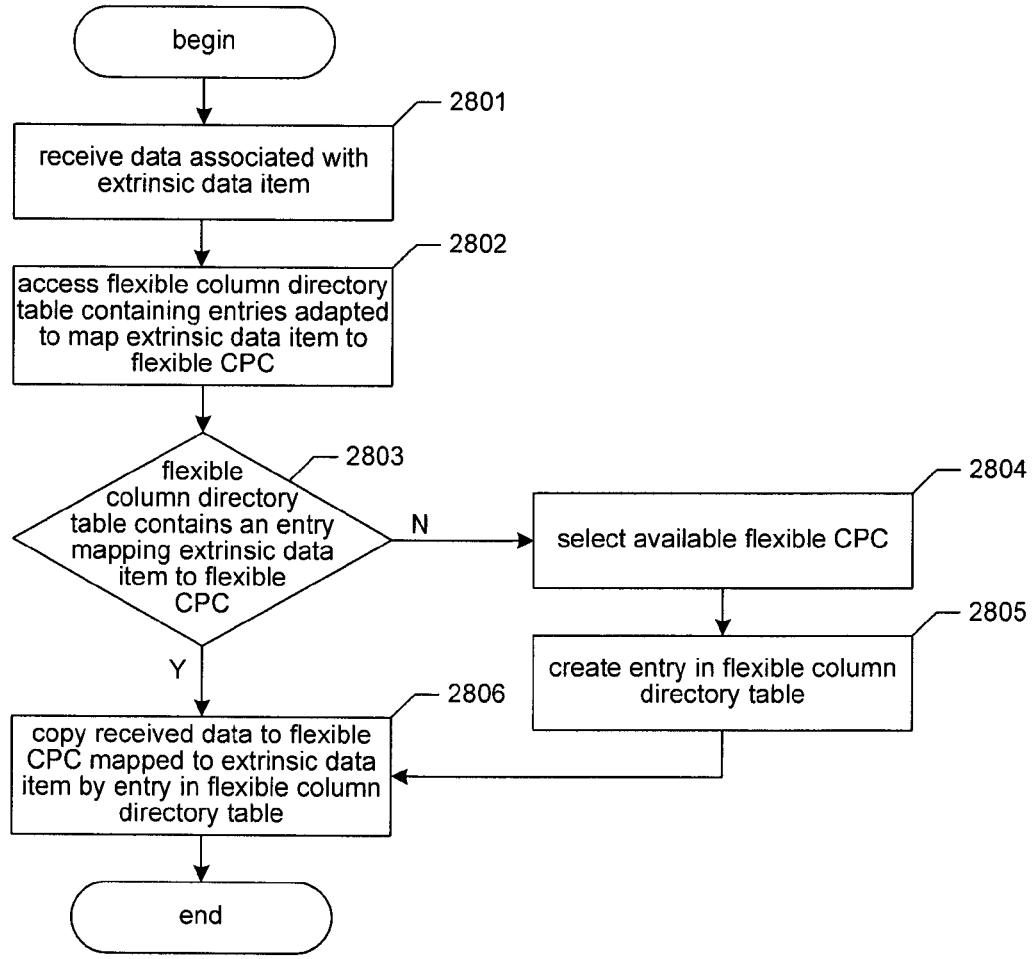
FIG. 28 is a flow diagram showing steps typically performed by the facility to process received data associated with an extrinsic data item.

FIG. 28 is a flow diagram showing steps typically performed by the facility to process received data associated with an extrinsic data item. In step 2801, the facility receives data associated with a particular extrinsic data item of a specified type. In step 2802, the facility accesses a flexible column directory table containing entries, each of which is adapted to map a particular extrinsic data item to a flexible column pool column. In step 2803, if the flexible column directory table contains an entry mapping the particular extrinsic data item to a flexible column pool column, the facility continues in step 2806, else the facility continues in step 2804. In step 2804, the facility selects an available flexible column pool column of the specified type that existed at the time the receiving of data associated with the particular extrinsic data item of the specified type occurred. In step 2805, the facility creates an entry in the flexible column directory table that maps the particular extrinsic data item to the available flexible column pool column of the specified type. In some embodiments, the facility performs steps 2805 and 2806 by the process shown in FIG. 17. After step 2805, the facility continues in step 2806. In step 2806, the facility copies the received data to the flexible column pool column that is mapped to the particular extrinsic data item by the entry created in the flexible column directory table. In some embodiments, the facility performs step 2806 by the process shown in FIG. 15. After step 2806, these steps conclude.

It will be appreciated by those skilled in the art that the above-described facility may be straightforwardly adapted or extended in various ways. For example, the facility may be used to replicate various kinds of data between various kinds of databases. The facility may be implemented using a variety of database techniques. The facility may be implemented with only a portion of the aspects discussed above, and/or may be implemented with additional aspects not described. While the foregoing description makes reference to preferred embodiments, the scope of the invention is defined solely by the claims that follow and the elements recited therein.

We claim:

1. A computer-readable storage medium whose contents cause a computing system to perform a method for storing extrinsic data in an application, comprising:

receiving data associated with a particular extrinsic data item of a specified type, extrinsic data items not being among a set of intrinsic data items for which the application can store data when in an initial state;

accessing a column directory table containing zero or more entries, each entry mapping a particular extrinsic data item to a column pool column;

determining whether the column directory table contains an entry mapping the particular extrinsic data item to a column pool column;

if the column directory table does not contain an entry mapping the particular extrinsic data item to a column pool column:

selecting an available column pool column, wherein the available column pool column has a specified type identical to the specified type of the particular extrinsic data item, wherein the available column pool column of the specified type existed at the time the receiving of data associated with the particular extrinsic data item of the specified type occurred, and wherein the available column pool column of the specified type is contained in a table that has a particular schema at the time the receiving of data associated with the particular extrinsic data item of the specified type occurred; and creating an entry in the column directory table that maps the particular extrinsic data item to the available column pool column of the specified type;

determining that the particular extrinsic data item is a multivalued extrinsic data item and that the data received for the particular extrinsic data item includes multiple values;

in response to determining that the particular extrinsic data item is a multivalued extrinsic data item:

selecting an association table key to represent the particular extrinsic data item in an association table; and for each value of the data received for the particular extrinsic data item, storing a row in the association table, the stored row containing (1) the selected association table key and (2) an indication of the value;

without altering the particular schema of the table containing the available column pool column of the specified type, copying the received data to the column pool column that is mapped to the particular extrinsic data item by the entry created in the column directory table, wherein the received data copied to the column pool column that is mapped to the particular extrinsic data item by the entry created in the column directory table is the selected association table key;

receiving a request to access the multiple values of the particular extrinsic data item, wherein the request includes an identifier of the particular extrinsic data item; and in response to the received request:

accessing the column directory table;

based on the identifier of the particular extrinsic data item, identifying the entry in the column directory table mapping the particular extrinsic data item to the column pool column;

based on the identified entry, accessing the column pool column;

identifying the association table key in the column pool column that represents the particular extrinsic data item in the association table;

accessing the association table; and based on the identified association table key, accessing the multiple values of the particular extrinsic data item in the association table.

2. The computer-readable storage medium of claim 1 wherein the received data is also associated with a particular entity, and wherein the received data is copied to a field in the column pool column that is mapped to the particular extrinsic data item by the entry created in the column directory table, wherein the field corresponds to the particular entity.

3. The computer-readable storage medium of claim 1, the method further comprising, if the column directory table does not contain an entry mapping the particular extrinsic data item to a column pool column, identifying an available column pool column of the specified type using a column inventory table.

4. The computer-readable storage medium of claim 1, the method further comprising generating a report that includes both (1) data for the particular extrinsic data item retrieved from the column pool column that is mapped to the particular extrinsic data item by the entry created in the column directory table and (2) data for an intrinsic data item not contained in any column pool column.

5. The computer-readable storage medium of claim 1, the method further comprising:
  receiving weights for the received values of the particular extrinsic data item; and
  for each of the values of the data received for the particular extrinsic data item, storing the weight received for the value in the row of the association table containing an indication of the value.

6. The computer-readable storage medium of claim 1 wherein each indication of the value of the data received for the particular extrinsic data item stored in the association table explicitly contains the value.

7. The computer-readable storage medium of claim 1 wherein each indication of the value of the data received for the particular extrinsic data item stored in the association table contains a key usable to look up the value in a separate table.

8. The computer-readable storage medium of claim 1, the method further comprising:
  determining that the particular extrinsic data item is a weighted extrinsic data item;
  receiving weights for the received values of the particular extrinsic data item;
  in response to determining that the particular extrinsic data item is a weighted extrinsic data item, allocating an additional column pool column to contain weights for values of the particular extrinsic data item; and
  copying the received weights to the allocated additional column pool column.

9. The computer-readable storage medium of claim 8, the method further comprising generating a report that includes both (1) data for the particular extrinsic data item retrieved from the column pool column that is mapped to the particular extrinsic data item by the entry created in the column directory table and (2) the weights for the values of the particular extrinsic data item retrieved from the allocated additional column pool column.

10. A method for storing extrinsic data in an application that is performed by one or more computing systems, each computing system having a processor and memory, the method comprising:
  receiving data associated with a particular extrinsic data item of a specified type, extrinsic data items not being among a set of intrinsic data items for which the application can store data when in an initial state;
  accessing a column directory table containing zero or more entries, each entry mapping a particular extrinsic data item to a column pool column;
  determining whether the column directory table contains an entry mapping the particular extrinsic data item to a column pool column;
  if the column directory table does not contain an entry mapping the particular extrinsic data item to a column pool column:
    selecting an available column pool column, wherein the available column pool column has a specified type identical to the specified type of the particular extrinsic data item, wherein the available column pool column of the specified type existed at the time the receiving of data associated with the particular extrinsic data item of the specified type occurred, wherein the available column pool column of the specified type is contained in a table that has a particular schema at the time the receiving of data associated with the particular extrinsic data item of the specified type occurred; and
    creating an entry in the column directory table that maps the particular extrinsic data item to the available column pool column of the specified type;
  determining that the particular extrinsic data item is a multivalued extrinsic data item and that the data received for the particular extrinsic data item includes multiple values;
  in response to determining that the particular extrinsic data item is a multivalued extrinsic data item:
    selecting an association table key to represent the particular extrinsic data item in an association table; and
    for each value of the data received for the particular extrinsic data item, storing a row in the association table, the stored row containing (1) the selected association table key and (2) an indication of the value; and
  without altering the particular schema of the table containing the available column pool column of the specified type, copying the received data to the column pool column that is mapped to the particular extrinsic data item by the entry created in the column directory table, wherein the received data copied to the column pool column that is mapped to the particular extrinsic data item by the entry created in the column directory table is the selected association table key;
  receiving, by the one or more computing systems, a request to access the multiple values of the particular extrinsic data item, wherein the request includes an identifier of the particular extrinsic data item; and
  in response to the received request:
    accessing, by the one or more computing systems, the column directory table;
    based on the identifier of the particular extrinsic data item, identifying, by the one or more computing systems, the entry in the column directory table mapping the particular extrinsic data item to the column pool column;
    based on the identified entry, accessing, by the one or more computing systems, the column pool column;
    identifying, by the one or more computing systems, the association table key in the column pool column that represents the particular extrinsic data item in the association table;
    accessing, by the one or more computing systems, the association table; and
    based on the identified association table key, accessing, by the one or more computing systems, the multiple values of the particular extrinsic data item in the association table.

11. A computer-readable storage medium whose contents cause a computing system to perform a method for storing extrinsic data in an application, comprising:
  receiving data associated with a particular extrinsic data item of a specified type, extrinsic data items not being among a set of intrinsic data items for which the application can store data when in an initial state;
  accessing a column directory table containing zero or more entries, each entry mapping a particular extrinsic data item to a column pool column;
  determining whether the column directory table contains an entry mapping the particular extrinsic data item to a column pool column;

if the column directory table does not contain an entry mapping the particular extrinsic data item to a column pool column:
  selecting an available column pool column, wherein the available column pool column has a specified type identical to the specified type of the particular extrinsic data item, wherein the available column pool column of the specified type existed at the time the receiving of data associated with the particular extrinsic data item of the specified type occurred, and wherein the available column pool column of the specified type is contained in a table that has a particular schema at the time the receiving of data associated with the particular extrinsic data item of the specified type occurred; and
  creating an entry in the column directory table that maps the particular extrinsic data item to the available column pool column of the specified type;
without altering the particular schema of the table containing the available column pool column of the specified type, copying the received data to the column pool column that is mapped to the particular extrinsic data item by the entry created in the column directory table;
receiving a request to access the data associated with the particular extrinsic data item, wherein the request includes an identifier of the particular extrinsic data item;
in response to the received request:
  accessing the column directory table;
  based on the identifier of the particular extrinsic data item, identifying the entry in the column directory table mapping the particular extrinsic data item to the column pool column;
  based on the identified entry, accessing the column pool column; and
  accessing the data associated with the particular extrinsic data item in the column pool column; and
in response to receiving an indication that the particular extrinsic data item has been removed, removing the entry in the column directory table that maps the particular extrinsic data item to the available column pool column of the specified type.

12. A method for storing extrinsic data in an application that is performed by one or more computing systems, each computing system having a processor and memory, the method comprising:
  receiving data associated with a particular extrinsic data item of a specified type, extrinsic data items not being among a set of intrinsic data items for which the application can store data when in an initial state;
  accessing a column directory table containing zero or more entries, each entry mapping a particular extrinsic data item to a column pool column;
  determining whether the column directory table contains an entry mapping the particular extrinsic data item to a column pool column;
  if the column directory table does not contain an entry mapping the particular extrinsic data item to a column pool column:
    selecting an available column pool column, wherein the available column pool column has a specified type identical to the specified type of the particular extrinsic data item, wherein the available column pool column of the specified type existed at the time the receiving of data associated with the particular extrinsic data item of the specified type occurred, and wherein the available column pool column of the specified type is contained in a table that has a particular schema at the time the receiving of data associated with the particular extrinsic data item of the specified type occurred; and
    creating an entry in the column directory table that maps the particular extrinsic data item to the available column pool column of the specified type;
  without altering the particular schema of the table containing the available column pool column of the specified type, copying the received data to the column pool column that is mapped to the particular extrinsic data item by the entry created in the column directory table;
  receiving, by the one or more computing systems, a request to access the data associated with the particular extrinsic data item, wherein the request includes an identifier of the particular extrinsic data item;
  in response to the received request:
    accessing, by the one or more computing systems, the column directory table;
    based on the identifier of the particular extrinsic data item, identifying, by the one or more computing systems, the entry in the column directory table mapping the particular extrinsic data item to the column pool column;
    based on the identified entry, accessing, by the one or more computing systems, the column pool column; and
    accessing, by the one or more computing systems, the data associated with the particular extrinsic data item in the column pool column; and
  in response to receiving an indication that the particular extrinsic data item has been removed, removing the entry in the column directory table that maps the particular extrinsic data item to the available column pool column of the specified type.

13. A method for accessing extrinsic data in an application that is performed by one or more computing systems, each computing system having a processor and memory, the method comprising:
  receiving, by the one or more computing systems, a request to access data associated with a particular extrinsic data item, wherein the request includes an identifier of the particular extrinsic data item, the particular extrinsic data item not among a set of intrinsic data items for which the application can store data when in an initial state; and
  in response to the received request:
    accessing, by the one or more computing systems, a column directory table containing one or more entries, each entry mapping a particular extrinsic data item to a column pool column;
    based on the identifier of the particular extrinsic data item, identifying, by the one or more computing systems, an entry in the column directory table mapping the particular extrinsic data item to a column pool column;
    based on the identified entry, accessing, by the one or more computing systems, the column pool column; and
    accessing, by the one or more computing systems, the data associated with the particular extrinsic data item in the column pool column.

* * * * *